Feb. 14, 1928.
J. D. VAN ATTA
1,659,126
DRAIN VALVE
Filed Feb. 15, 1926   2 Sheets-Sheet 1
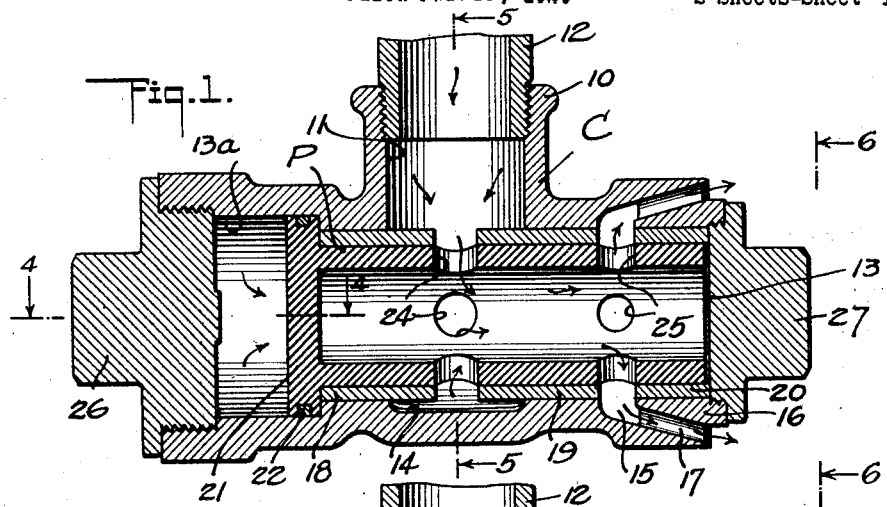
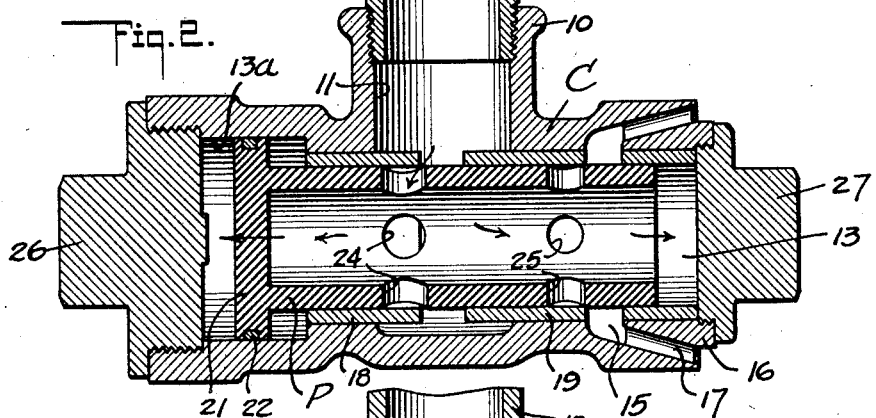
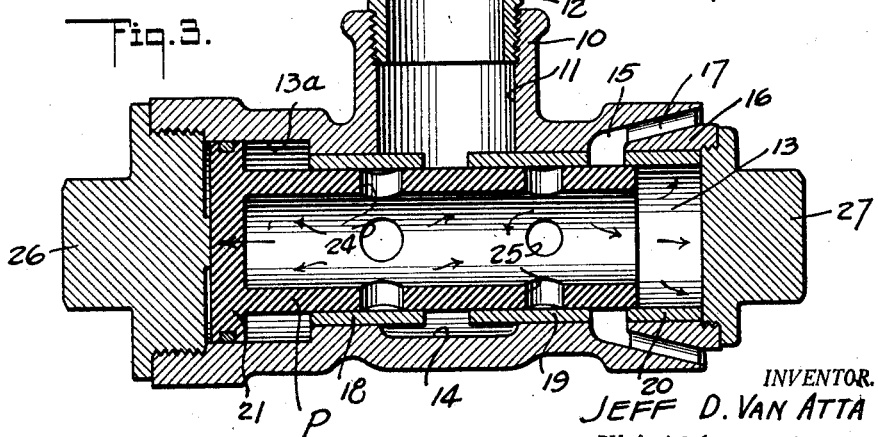
INVENTOR.
JEFF D. VAN ATTA
BY Munn & Co.
ATTORNEYS.

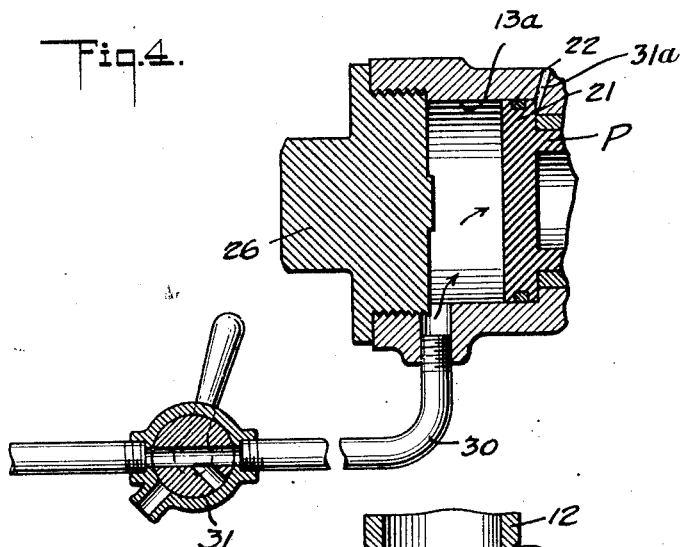
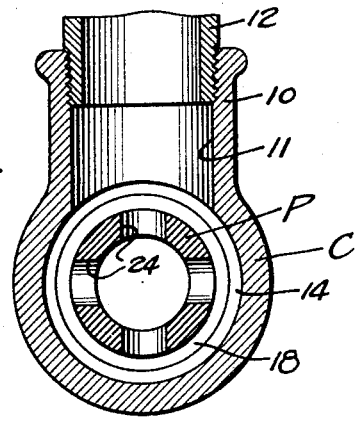
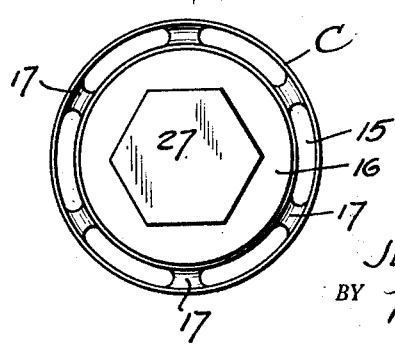

Patented Feb. 14, 1928.

1,659,126

UNITED STATES PATENT OFFICE.

JEFF D. VAN ATTA, OF WINSLOW, ARIZONA.

DRAIN VALVE.

Application filed February 15, 1926. Serial No. 88,378.

My invention relates generally to valves, and a purpose of my invention is the provision of a drain valve particularly adapted, although not necessarily, for use in draining the steam cylinders of a locomotive of the products of condensation accumulating therein when the steam supply to the cylinders is shut off, the valve operating when closed to effectively seal the cylinder against the escape of steam to thereby prevent the loss of pressure during the operation of the locomotive, and to exclude air, thus preventing carbonizing of the cylinder lubricant, especially when employing superheated steam.

A further purpose of my invention is the provision of a drain valve in which pressure from within the locomotive cylinder is utilized to maintain the valve closed, the valve being so constructed that negative pressure created within the cylinder will be ineffective to open the valve, thus positively preventing chattering of the latter with the consequent wear and loss of efficiency.

I will describe only one form of drain valve embodying my invention and will then point out the novel features thereof in claims.

In the accompanying drawings,

Figure 1 is a view showing in vertical longitudinal section one form of drain valve embodying my invention in open position;

Figure 2 is a view similar to Figure 1 and showing the valve partially closed;

Figure 3 is a view similar to Figure 1 and showing the valve fully closed;

Figure 4 is a fragmentary sectional view taken on the line 4—4 of Figure 1;

Figure 5 is a transverse sectional view taken on the line 5—5 of Figure 1; and

Figure 6 is a view in end elevation of the outlet end of the valve.

Referring specifically to the drawings, my invention, in its present embodiment, comprises a valve body designated generally at C of substantially cylindrical form having a nipple 10 intermediate of its ends provided with a bore 11 constituting an inlet to the body. The bore 11 is threaded to receive the lower end of the drain pipe 12 of a locomotive cylinder (not shown) so as to support the body in horizontal position below the cylinder. The valve body is formed to provide an elongated valve chamber 13 communicating with the bore 11 and extending longitudinally in the body, while a relatively large short chamber 13ª is formed at one end of the body in alinement with the chamber 13. As clearly shown in Figure 5, an annular recess 14 is formed in the chamber 13 at the bore 11. Adjacent the opposite end of the valve body an annular cone-shaped passage 15 constituting an outlet from the body communicates with the chamber 13 and diverges to the end of the body. The frustoconical section 16 formed by the provision of the passage 15 is supported by means of connecting webs 17 arranged at circumferentially spaced intervals in the passage 15. Liners 18, 19 and 20 are fitted within the chamber 13 and are spaced apart at the inlet and outlet of the valve body, as clearly illustrated in Figures 1 to 3, inclusive.

Slidably mounted within the liners is a valve in the form of a tubular piston P, one end of which is closed by a head 21 having an annular peripheral groove to receive a sealing ring 22, the head being slidably mounted within the chamber 13ª. A plurality of inlet and outlet ports 24 and 25, respectively, are formed circumferentially of and extend radially through the wall of the piston, and are adapted to connect or disconnect the inlet and outlet of the body accordingly as the piston occupies the open position shown in Figure 1 or the closed position as shown in Figure 3.

The ends of the valve body C are closed by screw plugs 26 and 27. A pipe 30 leading from a suitable source of air supply under pressure (not shown) is connected to the valve body in communication with the interior of the chamber 13ª. A conventional three-way valve 31 is interposed in the pipe and is adapted to be operated to either admit air to the chamber or to cut off the supply of air and vent the chamber to atmosphere. As shown in Figure 4, a vent port 31ª communicates with the chamber 13ª so that any leakage of air past the sealing ring 22 will be free to pass to atmosphere and thus prevent the balancing of pressure at opposite sides of the head 21.

It will be noted that the outlet ports 25 are of slightly less diameter than the inlet ports and that the spacing between the liners 19 and 20 and between the liners 18 and 19 corresponds to the diameter of the outlet and inlet ports, respectively.

In operation, with the piston P occupying the closed position shown in Figure 3 and the valve 31 closed, the inlet and outlet of the valve body C are disconnected from each other and from the interior of the piston. When it is desired to drain the locomotive cylinder, such as, for instance, before starting the locomotive, the valve 31 is opened and air under pressure permitted to enter the chamber 13ª and act upon the head of the piston to move the latter to the open position shown in Figure 1. Any water which had previously accumulated within the locomotive cylinder is then free to drain from the latter, and upon starting of the locomotive, steam from the cylinder passes through the valve, filling the interior of the piston and urging the latter towards the closed position. With the water completely drained from the cylinder the valve 31 is closed, thus cutting off the supply of air to the piston and venting the interior of the chamber 13ª to atmosphere. The steam from the cylinder passing through the valve now acts upon the piston and moves it to closed position. By reference to Figure 2, it will be noted that during this closing movement of the piston the outlet ports 25 are disconnected from the passage 15 in advance of the disconnection of the inlet ports 24 from the inlet 11 so that steam is permitted to enter the interior of the piston after the outlet of the valve is closed. Upon continued movement of the piston, its inlet ports 24 are then disconnected, thus trapping a quantity of steam in the interior of the piston and at one side thereof, which steam under its expansive action moves the piston to the fully closed position shown in Figure 3. By virtue of the annular recess 14 surrounding the piston, the pressure of steam from the cylinder is balanced upon the piston so that air under a relatively low pressure is sufficient to again open the valve. Should the valve when closed be jarred sufficiently to move the piston and connect its inlet ports 24 with the inlet 11, steam from the cylinder will again enter the interior of the piston and act against the latter, to move it to closed position.

Although I have herein shown and described only one form of drain valve embodying my invention, it is to be understood that various changes and modifications may be made therein without departing from the spirit of the invention and the spirit and scope of the appended claims.

I claim as my invention:

1. A drain valve for steam engine cylinders comprising a valve body having inlet and outlet ports, a valve movable in the body and having inlet and outlet ports adapted to be connected with or disconnected from the body ports to accordingly open or close the valve, means for moving the valve in one direction to thereby connect said ports, and means whereby steam entering the inlet ports is caused to act upon the valve to move the latter in another direction and thereby disconnect the ports.

2. A drain valve as embodied in claim 1 wherein the ports of the body and valve are so positioned with respect to each other that during the closing movement of the valves the outlet ports will be disconnected in advance of the inlet ports, whereby steam entering the latter ports will normally urge the valve to closed position.

3. A drain valve as embodied in claim 1 wherein the movement of the valve in the body is such that when their ports are disconnected positive or negative pressure created within the engine cylinder will be ineffective to open the valve.

4. A drain valve for steam engine cylinders comprising a closed valve body having inlet and outlet ports, a valve having inlet and outlet ports and movable in the body to occupy an open position in which the body and valve ports are connected, a second position in which the outlet ports are closed and the inlet ports are open whereby steam from the engine cylinder is free to flow through the inlet ports and thereby urge the valve towards closed position, and a third position in which the inlet and outlet ports are closed and a quantity of steam is trapped within the body and under its expansive action moves the valve to closed position.

5. A drain valve for steam engine cylinders comprising a valve body having an inlet and an outlet port, a piston slidable in the body from one extreme position to another and comprising a hollow body open at one end only, said piston having inlet and outlet ports communicating with its interior and adapted to be connected with or disconnected from the valve body ports accordingly as the piston occupies one or the other of its extreme positions, and a head on the other end of the piston, a cylinder for said head, and means for admitting fluid under pressure to the cylinder to move the head in one direction.

6. A drain valve for steam engine cylinders comprising a valve body having inlet and outlet ports, a valve in the body movable from one extreme position to another, and having inlet and outlet ports adapted to be connected with or disconnected from the body ports accordingly as the valve occupies one or the other of its positions, means for moving the valve to the extreme position in which the ports are connected and means whereby steam passing through the inlet ports of the body and valve is caused to move the latter to the extreme position in which the ports are disconnected.

7. A drain valve for steam engine cylinders comprising a valve body having inlet and outlet ports, a valve in the body having inlet and outlet ports, said valve movable to occupy one position in which the inlet and outlet ports are connected to permit draining of the cylinder and movable to another position in which the inlet and outlet ports are disconnected, means for moving the valve to the position in which the ports are connected and means whereby steam entering the inlet ports is caused to act upon and move the valve to its second mentioned position.

8. A drain valve as embodied in claim 5 wherein the inlet and outlet ports of the valve body and piston are correlated in such manner that as the piston moves to one of its extreme positions the outlet ports will be disconnected in advance of the inlet ports.

9. A drain valve for engine cylinders comprising a body having inlet and outlet ports, a valve comprising a piston slidable in the casing and having inlet and outlet ports, adapted to be connected with or disconnected from the body ports according as the valve occupies one position or another, means for moving the valve to one of its positions, to connect the body and valve ports, said body and valve co-operating to provide a chamber at one side of the valve communicating with the valve ports, the body and valve ports being so positioned with respect to each other that during movement of the valve towards its other position, the outlet ports will be disconnected in advance of the inlet ports, whereby steam from the cylinder passing through said inlet ports and into said chamber will act against the valve to move it to its said other position.

10. A drain valve for engine cylinders comprising a body having inlet and outlet ports, a valve in the body having inlet and outlet ports adapted to be connected with or disconnected from the body ports to accordingly open or close the valve, means for moving the valve in one direction so as to connect the ports, the body and valve co-operating to provide a chamber communicating with the valve ports, into which steam from the cylinder is admitted through the inlet ports, and acts against the valve to move it in another direction and disconnect the ports.

11. A drain valve for engine cylinders comprising a body having inlet and outlet ports, a valve in the body having inlet and outlet ports adapted to be connected with or disconnected from the body ports to accordingly open or close the valve, means for moving the valve in one direction so as to connect the ports, the body and valve co-operating to provide a chamber communicating with the valve ports, into which steam from the cylinder is admitted through the inlet ports and acts against the valve to move it in another direction and disconnect the ports, the steam being trapped in said chamber upon disconnection of the ports and operating under its expansive action to further move the valve and seal the inlet and outlet of the body.

12. A drain valve for engine cylinders comprising a body having inlet and outlet ports, a valve in the body having inlet and outlet ports adapted to be connected with or disconnected from the body ports to acccordingly open or close the valve, means for moving the valve in one direction so as to connect the ports, the body and valve co-operating to provide a chamber communicating with the valve ports, into which steam from the cylinder is admitted through the inlet ports and acts against the valve to move it in another direction and disconnect the ports, the body and valve ports being so positioned with respect to each other that during closing movement of the valve the outlet ports will be disconnected in advance of the inlet ports so that upon disconnection of the ports a quantity of steam will be trapped in said chamber, and under its expansive action will further move the valve to seal the inlet and outlet ports of the body.

JEFF D. VAN ATTA.